H. HAYES.
MECHANICAL MICROSCOPE STAGE.
APPLICATION FILED FEB. 14, 1913.
1,080,968.
Patented Dec. 9, 1913.
2 SHEETS—SHEET 1.
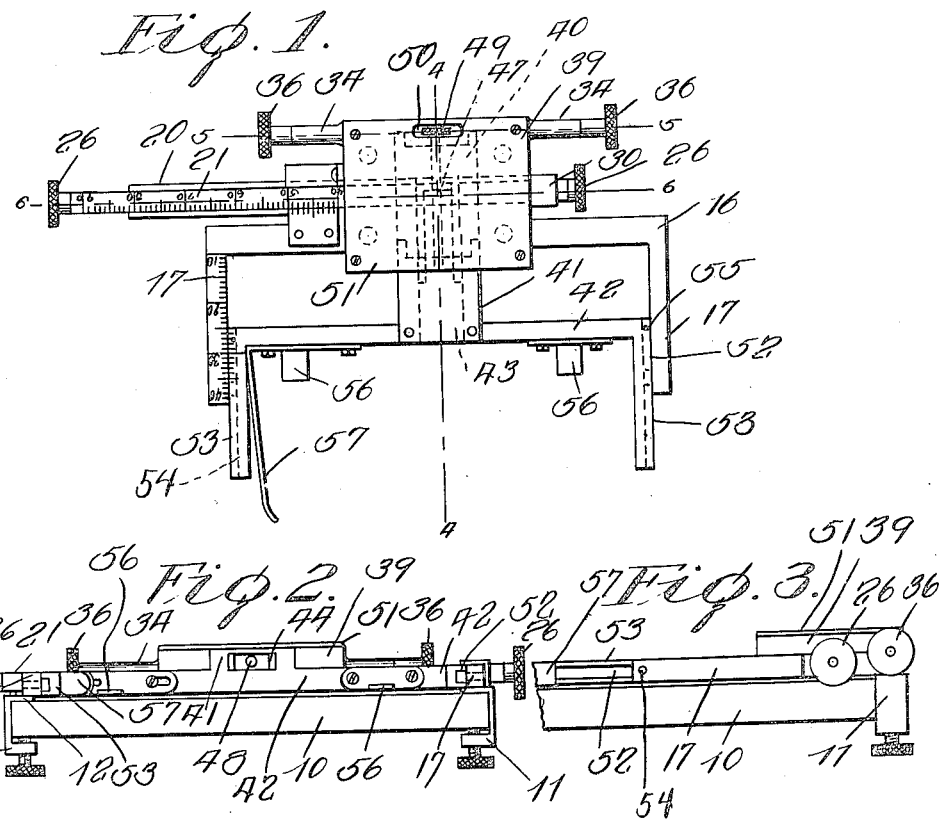
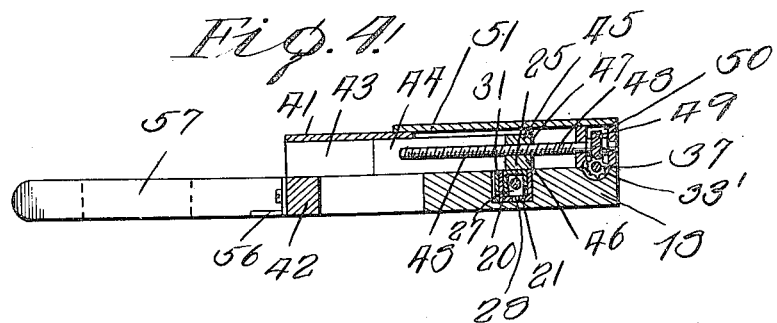
Witnesses
Inventor
H. Hayes

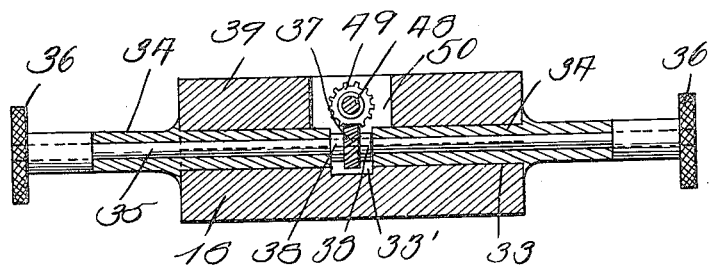
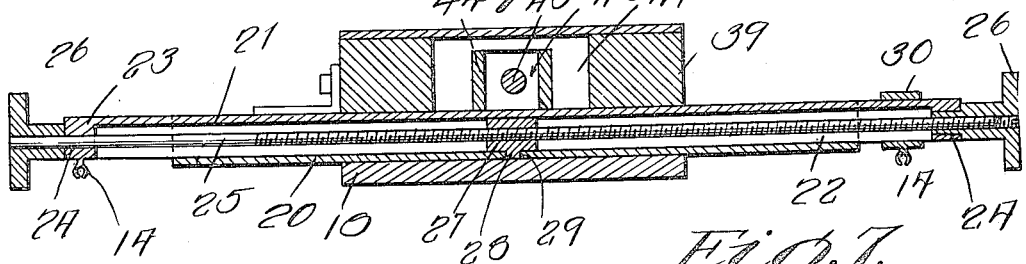
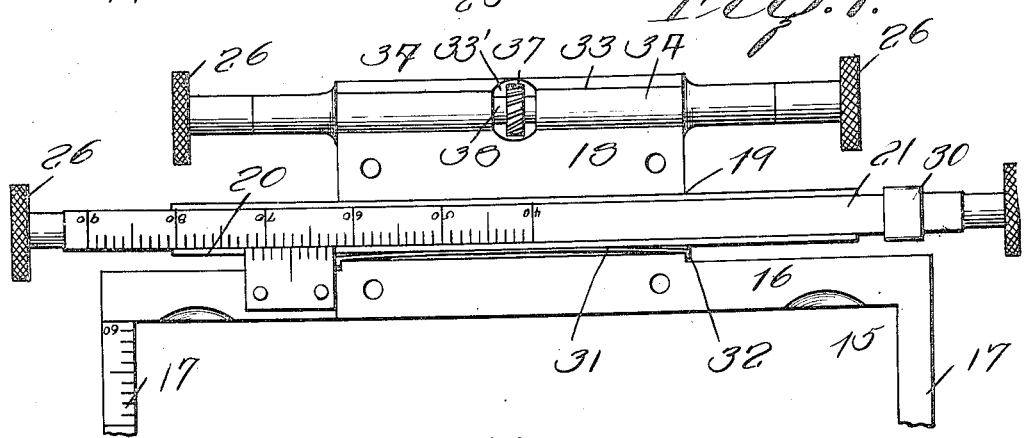
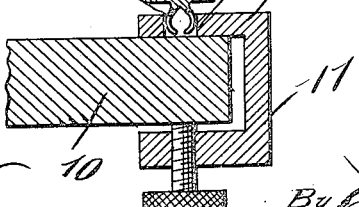

UNITED STATES PATENT OFFICE.

HENRY HAYES, OF BALTIMORE, MARYLAND.

MECHANICAL MICROSCOPE-STAGE.

1,080,968.  Specification of Letters Patent.  Patented Dec. 9, 1913.

Application filed February 14, 1913. Serial No. 748,449.

*To all whom it may concern:*

Be it known that I, HENRY HAYES, a citizen of the United States, residing at Baltimore, in the State of Maryland, have invented certain new and useful Improvements in Mechanical Microscope-Stages; and I do hereby declare the following to be a full, clear, and exact description of the invention, such as will enable others skilled in the art to which it appertains to make and use the same.

This invention relates to microscopes and more particularly to mechanical stages therefor, and has for its object to provide a mechanical microscope stage by means of which a slide may be positioned beneath the microscope and which, when the slide is so positioned will indicate its location by a scale system so that the slide may be again brought into the same position by setting the stage to the same scale marks.

Another object is to provide a stage of this kind which will include a provision for movement of the slide in two directions and which will be so constructed that the slide may be moved quickly to the desired position and may then be shifted by a fine adjusting mechanism, for the examination of an extended area upon the slide.

Another object is to provide a mechanism of this kind which may be easily and quickly attached to microscopes of different stage dimensions.

In the drawings forming a portion of this application, Figure 1 is a top plan of the mechanism; Fig. 2 is a front elevation; Fig. 3 is a side elevation; Fig. 4 is a section on line 4—4 of Fig. 1; Fig. 5 is a section on line 5—5 of Fig. 1, enlarged; Fig. 6 is a section on line 6—6 of Fig. 1, enlarged; Fig. 7 is an enlarged top plan view of the base portion with the upper section removed; Fig. 8 is a detail of the attaching structure.

Referring now to the drawings the reference character 10 is used to designate the usual stage plate of a microscope.

The present improved mechanical stage mechanism includes a pair of clamp members 11 which are engaged with the opposite sides of the stage plate 10 and have upper ears 12 resting upon the upper surface of the stage plate and provided with openings 13 as indicated particularly in Fig. 8. These openings are provided for the reception of resilient pins 14 carried by the stage mechanism.

As shown in Fig. 7 there is provided a base frame which includes a yoke 15 consisting of a back cross member 16 and forwardly extending spaced arms 17 and this yoke carries at the center of its bar 16 a rearwardly extended block 18 which is provided in its upper face with a channel 19 parallel with and adjacent to the bar 16. Slidably engaged in this channel 19 there is a sleeve member 20 which is open at its upper side and within which there is engaged a second sleeve member 21 having a longitudinal slot or opening 22 in its under side, both of these sleeve members being rectangular in cross sections.

Blocks 23 are provided at the ends of the member 21 and have journal openings 24 formed therethrough in which there are mounted the ends of the longitudinal shaft 25 which extends through the member 21 and which is provided with thumb wheels at its outer ends, these wheels being indicated at 26. The shaft 25 is threaded and thus acts as a feed screw for a block 27 which is engaged thereupon and which has a pin 28 engaged in an opening 29 formed in the bottom wall of the member 20. One end of the member 21 has slidably engaged thereupon a collar 30, which carries one of the pins 14, the other pin being carried by the member 21 at its other end. The two pins are engaged in the openings 13 of the members 11, as stated, and thus the base frame is connected with the stage plate of the microscope in a manner which permits it to be shifted transversely of the stage plate, the sliding engagement of the member 20 in the slot 19 permitting a quick or coarse movement of the base frame while the feed screw shaft 25 and its connection with the member 20 provides for a slow or fine adjustment of the base frame. To retard the free coarse movement of the base frame a bowed spring plate 31 is engaged between one wall of the slot 19 and one side of the member 20, and this plate has laterally turned ends 32 to prevent its disengagement.

Formed in the upper face of the block 18 there is a transverse groove 33 provided with an enlargement 33' at its center, and in this groove at opposite sides of the enlargement there are a pair of sleeves 34 which extend beyond the sides of the block, and within which there is journaled a shaft 35 having thumb wheels 36 at its outer ends. The shaft 35 carries a worm gear 37 at its center, within the enlarged pocket 33', and at opposite sides of the worm gear there are spacing collars 38 engaged with the shaft 35 and resting against the ends of the sleeves 34.

Disposed upon the upper face of the block 18 there is a second block 39, provided to receive the sleeves 34, and this block is provided with a central recess 40 opening through its forward end. Slidably engaged in the recess 40 there is a block 41 which, at its forward end is secured to a slide carrying yoke 42 which is slidably engaged between the arms 17 of the yoke 15 and which will be hereinafter more clearly described.

The block 41 is provided with a central longitudinal passage 43 within which there are slidably engaged the spring arms 44 of a fork member 45 having a base 46 at its rearward end, which is provided centrally with a threaded aperture 47 which receives a threaded feed shaft 48 journaled in the rearward portion of the block 39 and carrying a worm gear 49 lying in a pocket 50 formed in the rearward portion of the block 39, and meshing with the worm gear 37 so that when the thumb wheels 36 are turned the shaft 48 will be revolved and the yoke member 45 will be shifted in a direction at right angles to the movement of the base frame when the thumb wheels 26 are moved. It will be seen that there is thus provided a fine adjustment for the yoke 42 and that this yoke may be adjusted coarsely by shifting it and the block 41 with respect to the fork member 45.

A plate 51 is secured upon the upper surface of the block 39 to close the recess 40. The yoke 42 is provided with grooves 52 in the outer surfaces of its arms 53 and these grooves receive pins 54 projecting inwardly from the arms 17. The grooves 52 terminate short of the rearward ends of the arms 53, or may be closed by means of pins 55 so as to limit the forward movement of the yoke 42. Within the yoke 42 there are secured a pair of forwardly extending slide receiving stops 56 and at one end of the yoke there is an adjustable spring slide engaging finger 57.

As will be observed from the drawings, suitable scales are provided to indicate the position of the slide carrying yoke through both movements of the mechanism.

From the foregoing it will be seen that the present applicant has provided a mechanical stage for microscopes comprising attachment devices and two members which while they are movable with respect to each other to shift a slide in one direction are movable in unison to shift a slide in a direction at right angles thereto and while there is provided mechanical means for finely adjusting the shiftable parts through their movements these movable parts are also shiftable with respect to the adjusting mechanism to quickly bring them into approximately the desired position.

What is claimed is:

1. A microscope attachment comprising a slide carrier, micrometrical adjusting means, connections between the adjusting means and the slide carrier admitting a coarse adjustment of the carrier with respect to the micrometrical adjusting means, and attaching devices connected with the micrometrical adjusting means.

2. A microscope attachment comprising attaching devices, a member movable with respect to the attaching devices, means for adjusting the said member, said member being movable with respect to the adjusting means, a slide carrier carried by the first-named member, said slide carrier being shiftable with respect to the first-named member at right angles to the movement of said member, and means for moving the slide carrier, said carrier being shiftable with respect to its moving means.

3. A microscope attachment comprising attaching devices, a member movable with respect to the attaching devices, means for adjusting the said member, said member being movable with respect to the adjusting means, a slide carrier carried by the first-named member, said slide carrier being shiftable with respect to the first-named member at right angles to the movement of said member, and means for holding the movable member and the slide carrier yieldably against movement with respect to their moving means.

4. A microscope attachment comprising means for holding and moving a slide, pins carried by said slide holding and moving means, one of said pins being shiftable toward and away from the other, and apertured members corresponding in number with the pins, said pins being removably engaged in the apertures of said members, said members being constructed and arranged for attachment to the stage plate of a microscope, by which construction the distance between the stage plate engaging members may be varied to suit stage plates of different sizes.

5. In a microscope attachment, the combination with a slide carrier, of an attaching member, means located between the slide carrier and the attaching member for movement of the slide carrier with respect to the attaching member, said slide carrier being movable with respect to the moving means, and means for holding the slide carrier yieldably against such last-named movement.

6. A microscope attachment comprising an attaching member, feeding mechanism connected with the attaching member, a movable member connected with the feeding mechanism for movement thereby, a slide carrier, connections between the slide carrier and the movable member for movement of the slide carrier with the movable member, said connections being constructed and arranged to permit the sliding movement of the slide carrier with respect to the movable member.

7. A microscope attachment comprising a mounting, including a recessed block, a block slidable in the recess of the first-named block and having a passage formed therethrough, a slide carrier connected with the second-named block, a spring member slidably engaged in the passage of the second-named block and arranged to exert its spring action against free movement of the second-named block with respect to the spring member, and means for moving the spring member and therewith the block and slide carrier, with respect to the mounting.

8. In a microscope attachment, the combination with attaching devices, a member carried thereby, a feed screw journaled in the member, a traveler mounted upon the feed screw and lying within the member, a second member slidably engaged with the first member, connections between the traveler and the slidable member for simultaneous movement thereof, a slide carrier slidably connected with the slidable member and means for holding the connections yieldably against their sliding movement with respect to the slidable member.

9. In a microscope attachment, the combination with a block provided with a slot, of a sleeve member slidably engaged in the slot, a spring plate engaged in the slot and arranged to retard sliding movement of the block upon the sleeve member, attaching devices for the attachment, connections between the sliding sleeve member and the attaching devices for moving the sleeve member and therewith the block with respect to the attaching devices, and a slide carrier connected with the block.

10. In a microscope attachment, the combination with attaching means, of a member adjustably connected with the attaching means, means for adjusting the said member, a slotted block disposed with its slotted portion upon the adjustable member for sliding movement of the block with respect thereto, a spring plate engaged between a wall of the slot in the block and the adjustable member, to yieldingly resist sliding movement of the block upon the adjustable member, and a slide carrier connected with the block.

11. A microscope attachment including attaching means, a mounting slidably connected with the attaching means, means for shifting the mounting through its sliding movement, said mounting being bodily movable with respect to the shifting means, a slide carrier, connections between the slide carrier and the mounting for movement of the slide carrier with respect to the mounting at an angle to the movement of the mounting with respect to the attaching means, a block connected with the slide carrier and slidably engaged in the mounting, a spring member engaged with the block, said block being slidable with respect to the spring member, said spring member being constructed and arranged to exert its spring action against free sliding movement of the block with respect thereto, and connection between the spring member and the mounting, for moving the spring member and therewith the block and the slide carrier.

In testimony whereof, I affix my signature, in the presence of two witnesses.

HENRY HAYES.

Witnesses:
 THOS. MACKENZIE,
 GEORGE ELSTE.